United States Patent Office 3,019,237
Patented Jan. 30, 1962

3,019,237
ALKYLATION OF 4-POSITION OF A
$\Delta^4$-11-OXYGENATED PREGNENE
Raymond L. Pederson, Kalamazoo, and John C. Babcock, Portage Township, Kalamazoo County, Mich., assignors to The Upjohn Company, Kalamazoo, Mich., a corporation of Michigan
No Drawing. Filed June 2, 1958, Ser. No. 738,975
5 Claims. (Cl. 260—397.3)

The present invention relates to new steroids and to the production thereof, and is more particularly concerned with 4-alkyl-11-oxygenated-4-pregnene-3,20-diones, 4-alkyl-11-oxygenated-21-hydroxy-4-pregnene-3,20-diones, the 21 esters thereof and processes for the production thereof.

The novel 4-alkyl-11-oxygenated-4-pregnene-3,20-diones of this invention possess valuable anti-inflammatory, glucocorticoid, progestational, and pituitary regulating activities of improved therapeutic ratio. These compounds are useful in the treatment of inflammatory conditions of the skin, eyes and ears of humans and of valuable domestic animals, as well as contact dermatitis and other allergic reactions. In addition, the compounds of the present invention exhibit valuable central-nervous-system-regulating properties.

The novel 4-alkyl-11-oxygenated-4-pregnene-3,20-diones of this invention can be prepared and administered to the animal organism in a wide variety of oral or parenteral dosage forms singly, or in admixture with other coacting compounds. They can be associated with a carrier which can be a solid material or a liquid in which the compound is dissolved, dispersed or suspended. The solid compositions can take the form of tablets, powders, capsules, pills or the like, preferably in unit dosage forms for simple administration or precise dosages. The liquid compositions can take the form of solutions, emulsions, suspensions, syrups or elixirs. The novel compounds can also be administered topically in the form of ointments, creams, lotions and the like, with or without coacting antibiotics, germicides or other materials forming advantageous combinations therewith.

The novel steroids of the present invention and the processes for the production thereof are represented by the following sequence of formulae:

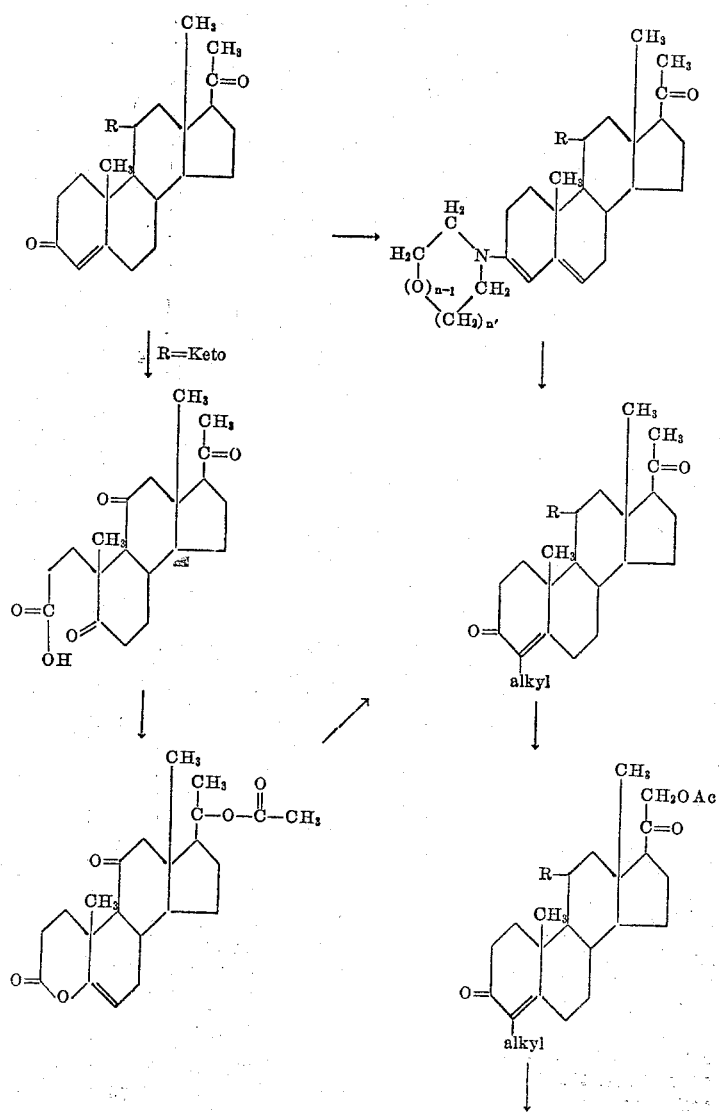

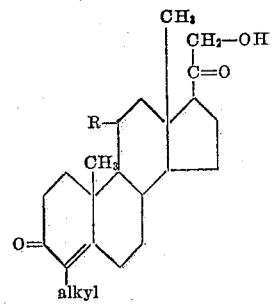

wherein R is α-hydroxy, β-hydroxy and keto, $n$ and $n'$ are whole numbers from one to two, inclusive, "alkyl" is a lower-alkyl radical containing from one to four carbon atoms inclusive, and Ac is an acyl radical of an organic carboxylic acid, preferably a hydrocarbon carboxylic acid containing from one to twelve carbon atoms, inclusive.

The process of the present invention comprises: treating 11-oxygenated-4-pregnene-3,20-dione with a secondary cyclic amine to produce the 3-enamine of the 11-oxygenated-4-pregnene-3,20-dione. The 3-enamine thus produced is then allowed to react with an alkylating agent to produce the 3-enamine of 4-alkyl-11-oxygenated-4-pregnene-3,20-dione, which on hydrolysis yields 4-alkyl-11-oxygenated-4-pregnene-3,20-dione.

An alternative process of the present invention comprises: treating 4-pregnene-3,11,20-trione with ozone and then with hydrogen peroxide to produce 5,11,20-triketo-3,5-seco-A-nor-pregnan-3-oic acid. The thus produced acid is treated with acetyl chloride in the presence of acetic anhydride to produce 5-hydroxy-11-keto-20-acetoxy-3,5-seco-A-nor-5,17-pregnadien-3-oic acid 3,5-lactone. The lactone thus produced is allowed to react with an alkyl Grignard reagent containing from two to five carbon atoms, inclusive, and then treated with a mixture of an organic acid and a mineral acid such as, for example, acetic acid and hydrochloric acid to produce 4-alkyl-4-pregnene-3,11,20-trione.

The compounds of the present invention are prepared from 11-oxygenated-4-pregnene-3,20-dione, i.e., 4-pregnene-3,11,20-trione (11-ketoprogesterone), 11β-hydroxy-4-pregnene-3,20-dione (11β-hydroxyprogesterone), and 11α-hydroxy-4-pregnene-3,20-dione (11α-hydroxyprogesterone), all of which are known compounds.

According to the preferred process of the present invention, the ketone group at the 3-position of the 11-oxygenated-4-pregnene-3,20-dione is converted to the 3-enamine derivative by reaction with a secondary cyclic amine. The enamine formation can be carried out in accordance with the disclosure of U.S. Patent 2,781,342. Amines which can be used are pyrrolidine, morpholine, piperidine, homomorpholine, C-alkyl substituted pyrrolidines, e.g., 2,4-dimethylpyrrolidine, 3-isopropylpyrrolidine, 3,3-dimethylpyrrolidine and the like; of these amines, pyrrolidine is preferred. The selected amine is usually used in a molar excess, calculated on the starting steroid, to achieve the optimum yield of enamine product. Although large molar equivalent excesses of an amine can be employed in the reaction, the preferred proportion of amine to starting steroid is usually from about 1.1 to about seven moles of amine per mole of steroid and especially from about 1.1 to two.

Moisture in the reaction can be somewhat detrimental to the procurement of high yields of product, and preferred reaction conditions therefore include removal of the water formed during the enamine formation by known methods. The reaction is preferably conducted above room temperature, i.e., above about 25 degrees centigrade, e.g., between about 25 and 150 degrees centigrade. Reaction times can vary between about a few minutes to several days, depending in part upon the reaction solvent or solvents, ratio of reactants, selected amine, rate of water removal and temperature. Solvents employed for the reaction are benzene, toluene, xylene, chlorobenzene, pentane, hexane, methylene chloride, carbon tetrachloride, methanol, ethanol, tertiary butyl alcohol, tetrahydrofuran, dioxane, and the like.

The 3-enamine of 11-oxygenated-4-pregnene-3,20-dione thus produced is then alkylated in a dry inert organic solvent such as ethanol, methanol, isopropanol, butanol, ethyl acetate, and the like, with an excess of an alkylating agent, such as an alkyl halide, to produce the 4-alkyl-3-enamine of 11-oxygenated-4-pregnene-3,20-dione. Suitable alkyl halides are those wherein the alkyl group has from one to four carbon atoms, inclusive, and the halogen is chlorine, bromine or iodine with bromine and iodine generally preferred. Representative alkylating agents include methyl, ethyl, propyl, isopropyl, butyl, isobutyl, and tertiary butyl bromide and iodide and allyl bromide. The corresponding alkyl chlorides are also operative.

A preferred method is to treat the isolated and dried 3-enamine of 11-oxygenated-4-pregnene-3,20-dione with an excess of alkyl iodide in dry methanol and reflux for about six hours to complete the reaction. At the end of the reflux period, the excess alkyl iodide is removed by distillation.

The 3-enamine of 4-alkyl-11-oxygenated-4-pregnene-3,20-dione thus produced can then be hydrolyzed with water, aqueous acid or base, or alkanol water mixtures. This treatment removes the 3-enamine group and results in regeneration of the Δ⁴-3-keto group in the steroid nucleus, with production of 4-alkyl-11-oxygenated-4-pregnene-3,20-dione.

A preferred method for the hydrolysis of the 3-enamine group is in an aqueous-methanol sodium hydroxide solution. The alkaline solution is heated under reflux for about one and one-half hours and then concentrated by distillation at atmospheric pressure to remove most of the methanol present. The hydrolysis mixture is then diluted with water and extracted with ether, methylene chloride, benzene, toluene, hexane, or the like. The combined solvent extracts are then dried and the solvent is removed by distillation to give the corresponding 4-alkyl-11-oxygenated-4-pregnene-3,20-dione, i.e., 4-alkyl-4-pregnene-3,11,20-trione, 4-alkyl-11β-hydroxy-4-pregnene-3,20-dione, and 4-alkyl-11α-hydroxy-4-pregnene-3,20-dione.

Illustrative of the compounds thus produced are 4-methyl-4-pregnene-3,11,20-trione,
4-ethyl-4-pregnene-3,11,20-trione,
4-propyl-4-pregnene-3,11,20-trione,
4-isopropyl-4-pregnene-3,11,20-trione,
4-butyl-4-pregnene-3,11,20-trione,
4-isobutyl-4-pregnene-3,11,20-trione,
4-tertiary butyl-4-pregnene-3,11,20-trione,
4-methyl-11β-hydroxy-4-pregnene-3,20-dione,
4-ethyl-11β-hydroxy-4-pregnene-3,20-dione,
4-propyl-11β-hydroxy-4-pregnene-3,20-dione,
4-isopropyl-11β-hydroxy-4-pregnene-3,20-dione,
4-butyl-11β-hydroxy-4-pregnene-3,20-dione,
4-isobutyl-11β-hydroxy-4-pregnene-3,20-dione, 4-tertiary butyl-11β-hydroxy-4-pregnene-3,20-dione,
4-methyl-11α-hydroxy-4-pregnene-3,20-dione,
4-ethyl-11α-hydrovy-4-pregnene-3,20-dione, and the like.

An alternate process for producing 4-alkyl-4-pregnene-3,11,20-trione is to allow a solution of 4-pregnene-3,11,20-trione to react with an ozone-oxygen mixture and then with hydrogen peroxide to produce 5,11,20-triketo-3,5-seco-A-nor-pregnan-3-oic acid. The intermediate acid thus produced can be isolated and purified by diluting the reaction mixture with water and extracting with ethyl acetate, methylene chloride, ether, chloroform, benzene, toluene and the like, ethyl acetate or methylene chloride being preferred. The thus produced intermediate steroid acid can be recovered by evaporation of the solvent or can be further purified by washing the combined solvent extracts with a dilute aqueous alkaline solution, such as for example, an aqueous five percent sodium carbonate solution, to form the soluble sodium salt of 5,11,20-triketo-3,5-seco-A-nor-pregnan-3-oic-acid. Acidification of the alkali wash and re-extraction with methylene chloride gives the above steroid acid on evaporation of the solvent.

The 5,11,20-triketo-3,5-seco-A-nor-pregnan-3-oic acid thus produced is dissolved in acetic anhydride and treated with acetyl chloride under reflux for a period of from thirty minutes to 72 hours. The reaction mixture is then concentrated by distillation to a viscous oil containing 5 - hydroxy-11-keto-20-acetoxy-3,5-seco-A-nor-5,17-pregnadien-3-oic acid 3,5-lactone.

The enol lactone thus produced is dissolved in ether, filtered and treated with an alkyl magnesium halide, containing from two to five carbon atoms, inclusive, such as for example, ethyl magnesium iodide, propyl magnesium bromide, butyl magnesium iodide, isobutyl magnesium bromide, pentyl magnesium iodide, and the like, for a reaction period of from thirty minutes to 72 hours. When the reaction is complete the excess Grignard reagent is destroyed by pouring the reaction mixture over cold aqueous ammonium chloride solution. The product of the reaction is extracted from the water with an organic solvent such as methylene chloride, ethyl acetate, chloroform, ether, benzene, toluene, and the like, methylene chloride being preferred. The combined solvent extracts are washed with water and the solvent evaporated leaving an oil. The oil thus obtained is then treated with a mixture of an organic and a mineral acid, such as for example, acetic acid and hydrochloric acid, and allowed to react for a period of from thirty minutes to 72 hours at a temperature from zero degrees centigrade to the reflux temperature of the reaction mixture. The reaction is usually run at room temperature for a reaction time of about 36 hours. When the reaction is complete, the reaction mixture is diluted with water and extracted with an organic solvent such as those employed in the above extractions, with diethyl ether being the preferred solvent. The combined ether extracts are then washed with aqueous alkali and water and the ether evaporated to yield 4-alkyl-4-pregnene-3,11,20-trione. The resulting products thus produced can be purified by recrystallization, chromatography, or both.

The compounds of this invention are also useful in the preparation of other physiologically active compounds. The 4-alkyl-11-hydroxy-4-pregnene-3,20-diones and 4-alkyl-4-pregnene-3,11,20-triones can be used to prepare compounds such as 4-alkylhydrocortisone, the 21-acylates thereof, 4-alkylepihydrocortisones, the 21-acylates thereof, 4-alkylcortisones, and the 21-acylates thereof. For example, by substituting a 4-alkyl-11-oxygenated-4-pregnene 3,20-dione, such as for example, 4-methyl-11β-hydroxy-4-pregnene-3,20-dione, 4 - ethyl - 11β-hydroxy-4-pregnene-3,20-dione, 4-propyl-11β-hydroxy-4-pregnene-3,20 - dione, 4-isobutyl-11β-hydroxy-4-pregnene-3,20-dione, 4-methyl-11α-hydroxy-4-pregnene-3,20-dione, 4-ethyl-11α-hydroxy-4-pregnene-3,20-dione, 4-methyl-4-pregnene-3,11,20 - trione, 4-ethyl-4-pregnene-3,11,20-trione, 4-isopropyl-4-pregnene-3,11,20-trione, 4-butyl-4-pregnene - 3,11,20 - trione, and the like in place of 11β-hydroxy-4-pregnene-3,20-dione (11β-hydroxy-progesterone) or 4-pregnene-3,11,20-trione (11-ketoprogesterone) respectively, the process disclosed in U.S. Patent 2,774,776 is productive of the corresponding 4-alkylhydrocortiosne, 4-alkylepihydrocortisone and 4-alkylcortisone, such as for example, 4-methylhydrocortisone, 4-ethylhydrocortisone, 4-propylhydrocortisone, 4-isobutylhydrocortisone, 4-methylepihydrocortisone, 4-ethylepihydrocortisone, 4-methylcortisone, 4-ethylcortisone, 4-isopropylcortisone, 4-butylcortisone, and the like.

The 4-alkylhydrocortisones, 4-alkylepihydrocortisones and 4-alkylcortisones thus produced can be esterified to produce the corresponding 4-alkylhydrocortisone 21-acylate, the corresponding 4-alkylepihydrocortisone 21-acylate, and the corresponding 4-alkylcortisone 21-acylate. The reaction can be performed under esterification conditions known in the art, e.g., by the reaction of the 21-hydroxy steroid with the selected acid halide, e.g., acid chloride or acid bromide, or the anhydride of a hydrocarbon carboxylic acid. Compounds thus produced include the 4-alkylhydrocortisone 21-acylates, 4-alkylepihydrocortisone 21-acylates, and the 4-alkylcortisone 21-acylates wherein the acyl radical is of an organic acid, preferably a hydrocarbon carboxylic acid containing from one to twelve carbon atoms, inclusive, e.g., formic, propionic, butyric, valeric, hexanoic, lauric, trimethylacetic, isobutyric, isovaleric, a cyclic acid, e.g., β-cyclopentylpropionic, cyclohexane-carboxylic, cyclohexylacetic, an alkaryl acid, e.g., benzoic, phenylacetic, β-phenylpropionic, o-, m-, p-toluic, saturated dibasic acids, e.g., succinic, adipic, monobasic unsaturated acids, acrylic, crotonic, undecylenic, propiolic, cinnamic, dibasic unsaturated acids, e.g., maleic, citraconic, other organic substituted acids, e.g., trifluoroacetic, chloroacetic, benzenesulfonic, and the like.

The 4-alkylhydrocortisones and 4-alkylepihydrocortisones, such as for example, 4-methylhydrocortisone, 4-ethylhydrocortisone, 4-propylhydrocortisone, 4-methylepihydrocortisone, 4-ethylepihydrocortisones, and the like can be made to react with an organic sulfonyl halide to obtain the corresponding 21-alkyl or aryl sulfonate and thereafter treating the thus-produced 21-alkyl or aryl sulfonate with sodium iodide in an acetone solution to obtain the corresponding 4-alkyl-21-iodohydrocortisone, or 4-alkyl-21-iodoepihydrocortisone and finally treating the thus-produced 4-alkyl-21-iodohydrocortisone or 4-alkyl-21-iodoepihydrocortisone with a reducing agent such as zinc dust, sodium thiosulfate, potassium bisulfite, sodium bisulfite and the like in an aqueous organic solvent mixture is productive of the corresponding 4-alkyl-21-desoxyhydrocortisone, or 4-alkyl-21-desoxyepihydrocortisone such as for example, 4-methyl-21-desoxyhydrocortisone, 4-ethyl-21-desoxyhydrocortistone, 4-methyl-21-desoxyepihydrocortisone, 4-ethyl-21-desoxyepihydrocortisone, and the like. If desired the 4-alkyl-21-desoxyhydrocortisone or 4-alkyl-21-desoxyepihydrocortisone can be oxidized with chromic acid, or in accordance with the process disclosed in U.S. Patent 2,751,402 for the oxidation of hydrocortisone acetate to cortisone acetate to give the corresponding 4-alkyl-21-desoxycortisone, such as for example, 4-methyl-21-desoxycortisone, 4-ethyl-21 - desoxycortisone and the like. Similarly, when 4-alkylcortisone, such as for example, 4-methylcortisone, 4-ethylcortisone, 4-isopropyl cortisone, and the like are used as starting material in the above series of reactions, 4-alkyl-2-desoxycortisones, such as for example, 4-methyl-21-desoxycortisone, 4-ethyl-21-desoxycortisone, 4-isopropyl-21-desoxycortisone, and the like are produced directly.

The 4-alkyl-11-oxygenated-4-pregnene-3,20-diones of the present invention are also useful as starting material for the preparation of 4-alkyl-11-oxygenated-21-acyloxy-4-pregnene-3,20-diones. For example, by substituting a 4-alkyl-11β-hydroxy-4-pregnene-3,20-dione (4-alkyl-11β-hydroxyprogesterone), a 4-alkyl-11α-hydroxy-4-pregnene-3,20-dione (4-alkyl-11α-hydroxyprogesterone) or a 4- alkyl-4-pregnene-3,11,20-trione (4-alkyl-11-ketoprogesterone) in place of 11β-hydroxyprogesterone, 11α-hydroxyprogesterone and 11-ketoprogesterone, respectively, the process disclosed in U.S. Patent 2,730,537 is productive of the corresponding 4-alkyl-11β-hydroxy-21-acyloxy-4-pregnene-3,20-dione, 4-alkyl-11α-hydroxy-21-acyloxy-4-pregnene-3,20-dione and the corresponding 4-alkyl 21-acyloxy-4-pregnene-3,11,20-trione respectively.

The 4-alkyl-11β-hydroxy-21-acyloxy-4-pregnene-3,20-diones, 4-alkyl-11α-hydroxy-21-acyloxy-4-pregnene-3,20-diones and 4-alkyl-21-acyloxy-4-pregnene-3,11,20-triones thus produced can be dissolved in an organic solvent such as methanol, ethanol, dioxane, and the like and saponified by addition of an aqueous alkaline solution, such as for example, aqueous sodium hydroxide, potassium carbonate, sodium bicarbonate and the like to produce the corresponding 4-alkyl-11β,21-dihydroxy-4-pregnene-3,20,dione, the corresponding 4-alkyl-11α,21-dihydroxy-4-pregnene-3,20-dione and the corresponding 4-alkyl-21-hydroxy-4-pregnene-3,11,20-trione, respectively.

The 4-alkylcortisones, 4-alkyl-21-acyloxycortisones, 4-alkylhydrocortisones, 4-alkyl-21-acyloxyhydrocortisones, 4-alkylepihydrocortisones, 4-alkyl-21-acyloxyepihydrocortisones, 4-alkyl-21-desoxycortisones, 4-alkyl-21-desoxyhydrocortisones, 4-alkyl-11β,21-dihydroxy-4-pregnene-3,20-diones, 4-alkyl-11β-hydroxy-21-acyloxy-4-pregnene-3,20-diones, 4-alkyl-11α,21-dihydroxy-4-pregnene-3,20-diones, 4-alkyl-11α-hydroxy-21-acyloxy-4-pregnene-3,20-diones, 4-alkyl-21-hydroxy-4-pregnene-3,11,20-triones, and 4-alkyl-21-acyloxy-4-pregnene-3,11,20-triones of the present invention are useful in that they exhibit central nervous-system-regulating, anti-inflammatory, glucocorticoid, progestational and pituitary-regulating activities of improved therapeutic ratio. Administration of these novel steroids can be in conventional dosage forms such as pills, tablets, capsules, syrups, or elixirs for oral use, or in liquid forms which are adaptable to the natural and synthetic steroid hormones for injectable products. Microcrystalline aqueous suspensions or oil solutions can be prepared for parenteral dosage.

The following examples are illustrative of the process and products of the present invention, but are not to be construed as limiting.

Example 1

*4-methyl-4-pregnene-3,11,20-trione and 4-methyl-17α-4-pregnene-3,11,20-trione*

A solution containing ten grams of 4-pregnene-3,11,20-trione in fifty milliliters of dry methanol was heated to reflux and ten milliliters of pyrrolidine was added with stirring. The heating was continued for one minute after the pyrrolidine was added. The reaction mixture was then cooled and the resulting precipitate was filtered, washed with ten milliliters of methanol and dried; yielding eleven grams of the 3-pyrrolidyl enamine of 4-pregnene-3,11,20-trione melting at 180 to 185 degrees centigrade and having an ultraviolet absorption of $$\lambda_{max}^{ether}\ 282\ m\mu$$

A mixture of eleven grams of 3-pyrrolidyl enamine of 4-pregnene-3,11,20-trione, 200 milliliters of absolute methanol and twenty milliliters of methyl iodide was warmed to reflux. After about thirty minutes solution was complete and reflux was continued for six hours. The excess methyl iodide was removed at the end of the reflux period by removing fifty milliliters of distillate. A solution containing two grams of sodium hydroxide in fifty milliliters of water was added and the resulting mixture was warmed under reflux for one and one-half hours. The solution was concentrated by distillation to about seventy milliliters and cooled. The concentrate was extracted with three 70-milliliter portions of methylene chloride. The combined extracts were washed with dilute acid, dilute alkali and water until neutral. The solution was dried over sodium sulfate and then concentrated to a syrup weighing 9.5 grams. Digestion of the syrup with ether gave 4.0 grams of ether soluble material. The ether soluble fraction was adsorbed on 150 grams of synthetic magnesium silicate and eluted with six percent acetone in Skellysolve B hexanes giving 0.28 gram of 4-methyl-17α-4-pregnene-3,11,20-trione, which on recrystallization from acetone-Skellysolve B hexanes gave 0.16 gram melting at 146 to 148 degrees centigrade. 4-methyl-17α-4-pregnene-3,11,20-trione exhibits central-nervous-system regulating properties, and, on epimerization with hydrogen chloride in chloroform or aqueous sodium hydroxide in methanol, is productive of the 17β-epimer, 4-methyl-11-ketoprogesterone.

Elution of the synthetic magnesium silicate column with seven percent acetone in Skellysolve B hexanes gave 0.554 gram of 4-methyl-4-pregnene-3,11,20-trione. Recrystallization from acetone-Skellysolve B hexanes gave 0.436 gram of purified 4-methyl-4-pregnene-3,11,20-trione melting at 185 to 186 degrees centigrade.

*Anal.*—Calculated for $C_{22}H_{30}O_3$: C, 77.49; H, 9.05. Found: C, 77.01; H, 8.57.

Substituting as starting material 11β-hydroxy-4-pregnene-3,20-dione or 11α-hydroxy-4-pregnene-3,20-dione in Example 1 as outlined above is productive of 4-methyl-11β-hydroxy-4-pregnene-3,20-dione and 4-methyl-11α-hydroxy-4-pregnene-3,20-dione, respectively.

Using 4-pregnene-3,11,20-trione, 11β-hydroxy-4-pregnene-3,20-dione or 11α-hydroxy-4-pregnene-3,20-dione as starting materials and substituting other alkyl halides containing from one to four carbon atoms, inclusive, such as for example, ethyl iodide, propyl bromide, isopropyl chloride, butyl iodide and the like and following the procedure outlined in Example 1 is productive of other 4-alkyl-11-oxygenated-4-pregnene-3,20-diones, such as for example, 4-ethyl-4-pregnene-3,11,20-trione, 4-propyl-4-pregnene-3,11,20-trione, 4-isopropyl-4-pregnene-3,11,20-trione, 4-butyl-4-pregnene-3,11,20-trione, 4-ethyl-11β-hydroxy-4-pregnene-3,20-dione, 4-propyl-11β-hydroxy-4-pregnene-3,20-dione, 4-isopropyl-11β-hydroxy-4-pregnene-3,20-dione, 4-butyl-11β-hydroxy-4-pregnene-3,20-dione, 4-ethyl-11α-hydroxy-4-pregnene-3,20-dione, 4-propyl-11α-hydroxy-4-pregnene-3,20-dione, and the like.

Example 1A

*4-methylhydrocortisone 21-actate*

As described above, 4-methylhydrocortisone 21-acetate, 4-methylcortisone 21-acetate, 4-methylhydrocortisone and 4-methylcortisone as well as other 4-alkylhydrocortisones, 4-alkylcortisones, and the 21-acylates thereof can be prepared using the process disclosed in U.S. Patent 2,774,776.

Alternatively, 4-methylhydrocortisone 21-acetate can be prepared according to the following example:

A mixture containing 12.12 grams of hydrocortisone 21-acetate, 3.7 milliliters of pyrrolidine and 300 milliliters of benzene was warmed at reflux under an atmosphere of nitrogen. Water formed during the reaction was removed by passing the condensate through a water-trap before returning it to the reaction flask. After a period of five hours of reflux the steroid was completely dissolved and the reaction was complete. The solvent was then removed by distillation in vacuo. The residue was twice dissolved in fifty milliliters of toluene and the toluene was removed each time by distillation in vacuo. The residual enamine was dissolved in 100 milliliters of absolute methanol and 25 milliliters of methyl iodide and then warmed at reflux for a period of six hours. The reaction solution was then distilled until fifty milliliters of distillate had been collected, thereby removing the excess methyl iodide. The reaction solution was diluted with fifty milliliters of methanol and ten milliliters of aqueous ten percent sodium hydroxide solution was added and the solution was warmed at reflux for a period of one hour. The methanol was removed by distillation in vacuo; extraction of the remaining aqueous mixture with 200 milliliters of chloroform gave three layers. The chloroform layer was separated and washed with water, dried over sodium sulfate and concentrated to a syrup, weighing 4.5 grams.

The syrup was dissolved in ten milliliters of pyridine, ten milliliters of acetic anhydride was added, and the solution was allowed to stand overnight. Water was added and the mixture was extracted with methylene chloride. The methylene chloride layer was separated, washed, dried over sodium sulfate, and then chromatographed over a column containing 150 grams of Florisil synthetic magnesium silicate. The column was developed with 250 milliliter fractions each of increasing proportions of acetone in 1:1 methylene chloride-Skellysolve B hexane as follows:

*Fractions 1–4.*—Five percent acetone in 1:1 methylene chloride-Skellysolve B hexane.
*Fractions 5–12.*—Six percent acetone in 1:1 methylene chloride-Skellysolve B hexane.
*Fractions 13–20.*—Seven percent acetone in 1:1 methylene chloride-Skellysolve B hexane.
*Fractions 21–28.*—Eight percent acetone in 1:1 methylene chloride-Skellysolve B hexane.

The solvent was evaporated from the fractions. The contents of fractions 11–18 exhibited an ultraviolet absorption $$\lambda^{alc.}_{max.}$$

249 m$\mu$ and were combined to give 1.1 grams of crude residue containing 4-methylhydrocortisone 21-acetate. Recrystallization from ninety percent methanol gave 330 milligrams of 4-methylcortisone 21-acetate melting at 159 to 161 degrees centigrade, and having a rotation of $[\alpha]_D$ plus 161 degrees in dioxane. The ultraviolet absorption was $$\lambda^{alc.}_{max.}$$

252 m$\mu$, $a_M$ 15,700

*Anal.*—Calculated for $C_{24}H_{34}O_6$: C, 68.87; H, 8.19. Found: C, 68.79; H, 8.17.

In the same manner substitution of cortisone 21-acetate for hydrocortisone 21-acetate is productive of 4-methylcortisone 21-acetate.

Similarly, using as starting material hydrocortisone, cortisone, hydrocortisone 21-acetate or cortisone 21-acetate, or substituting in place thereof other hydrocortisone 21-acylates or other cortisone 21-acylates and using as the alkylating agent methyl iodide or substituting in place thereof other alkyl halides containing from one to four carbon atoms inclusive, such as for example, ethyl iodide, propyl bromide, isopropyl chloride, butyl iodide and the like, and following the procedure of Example 1A is productive of the corresponding 4-alkylhydrocortisone 21-acetate or 4-alkylcortisone 21-acetate.

In the same manner, substitution of hydrocortisone and cortisone (or the corresponding 21-acylates thereof) for hydrocortisone 21-acetate in Example 1A, and using methyl iodide or other alkyl halide, for example, those listed above, as the alkylating agent therein, and omitting the reesterification step in Example 1A produces respectively the corresponding 4-alkylhydrocortisone and 4-alkylcortisone.

The 4-alkylhydrocortisones and 4-alkylcortisones thus produced can be esterified to produce the corresponding 4-alkylhydrocortisone 21-acylates and 4-alkylcortisone 21-acylates. The reaction can be performed under esterification conditions known in the art, e.g., by reaction of the selected 21-hydroxy steroid in pyridine with the selected acid halide, e.g., acid chloride or acid bromide, or the anhydride of an organic carboxylic acid, preferably a hydrocarbon carboxylic acid containing from one to twelve carbon atoms, inclusive, such as for example those acids previously listed. The 21-acylates thus produced, include 21-acetate, 21-propionate, 21-benzoate, 21-hemisuccinate, 21-acrylate, and the like, of the corresponding starting material.

The 4-methylhydrocortisone 21-acetate, 4-methylcortisone 21-acetate, or other 4-alkylhydrocortisone 21-acylates and 4-alkylcortisone 21-acylates, thus produced can be hydrolyzed to the corresponding free 21-alcohols in accordance with known methods for hydrolyzing Compound F 21-esters to the free Compound F alcohol. A preferred procedure is to employ at least a molar equivalent of an alkali-metal bicarbonate, e.g., potassium bicarbonate, in a substantially oxygen-free solution of a mixture of a lower alkanol and water. The hydrolysis reaction is carried out at a temperature between ten and seventy degrees centigrade while protecting the mixture from atmospheric oxygen. After the hydrolysis is complete, the reaction mixture is neutralized with an acid, e.g., acetic acid, and the hydrolyzed product recovered from the reaction mixture by evaporation and crystallization, extraction with methylene chloride and the like.

The 4-alkylhydrocortisones, 4-alkylcortisones, and the 21-acylates thereof possess central nervous-system-regulating, anti-rheumatoid arthritic, anti-inflammatory and glucocorticoid activities of improved therapeutic ratio, and in addition have a favorable effect on salt and water balance. These compounds are useful in the treatment of inflammatory conditions of the skin, eyes and ears of humans and of valuable domestic animals, as well as contact dermatitis and other allergic reactions. Administration of the novel steroids can be in conventional dosage forms, such as pills, tablets, capsules, syrups or elixirs for oral use, or in liquid forms which are adaptable to the natural and synthetic cortical steroid hormones for injectable products. The novel compounds can also be administered topically in the form of ointments, creams, lotions and the like, with or without coacting antibiotics, germicides or other materials forming advantageous combinations therewith.

EXAMPLE 1B

*4-methyl-9α-fluorohydrocortisone 21-acetate and 4-methyl-9α-fluorocortisone 21-acetate*

To a solution of 8.5 grams of 4-methylhydrocortisone 21-acetate in 42.5 milliliters of pyridine is added 5.63 grams of N-bromoacetamide. After standing at room temperature for a period of about fifteen minutes, the reaction solution is cooled to five to ten degrees centigrade and, with shaking, sulfur dioxide gas is passed over the surface until the solution gives no color with acidified starch-iodide paper. During the addition of sulfur dioxide gas, the reaction becomes warm. The temperature is kept under thirty degrees centigrade by external cooling and by varying the rate of sulfur dioxide addition. Thereafter to the reaction mixture 400 milliliters of ice water is added and the resulting precipitate collected by filtration. This material is recrystallized from acetone-Skellysolve B hexanes giving 4-methyl-17α,21-dihydroxy-4,9-(11)-pregnadiene-3,20-dione 21-acetate, a crystalline solid.

To a solution of 5.68 grams of 4-methyl-17α,21-dihydroxy-4,9(11)-pregnadiene-3,20-dione 21-acetate in 100 milliliters of methylene chloride and 250 milliliters of tertiary butyl alcohol is added a solution of fourteen milliliters of 72 percent perchloric acid in 100 milliliters of water followed by a solution of 2.34 grams of N-bromoacetamide in sixty milliliters of tertiary butyl alcohol. The reaction mixture is stirred until the reaction is complete whereupon excess oxidant is reduced with sodium sulfite and the reaction mixture is concentrated under reduced pressure until crystallization starts. The concentrate is cooled in an ice bath and while stirring 500 milliliters of water is added. After stirring for a period of about one hour, the crystalline product is isolated by filtration, the crystals are washed with water and air-dried giving 4-methyl-9α-bromo-11β,17α,21-trihydroxy-4-pregnene-3,20-dione 21-acetate (4-methyl-9α-bromohydrocortisone 21-acetate), a crystalline solid.

To a solution of 6.78 grams of 4-methyl-9α-bromo-11β, 17α,21-trihydroxy-4-pregnene-3,20-dione 21-acetate in 175 milliliters of acetone is added 6.78 grams of potassium acetate and the resulting suspension is heated under reflux for a period of about seventeen hours. The mixture is then concentrated to approximately sixty milliliters of volume at reduced pressure on the steam bath and thereupon is diluted with water and extracted with methylene chloride. The methylene chloride extracts are combined, washed with water, dried over anhydrous sodium sulfate and evaporated. The residue is redissolved in methylene chloride and chromatographed over Florisil anhydrous magnesium silicate, which on elution and crystallization gives 4-methyl-9β,11β-oxido-17α,21-dihydroxy-4-pregnene-3,20-dione 21-acetate, a crystalline solid.

To approximately 1.3 grams of hydrogen fluoride contained in a polyethylene bottle and maintained at minus sixty degrees centigrade is added 2.3 milliliters of tetrahydrofuran and then a solution of 500 milligrams of 4-methyl-9β,11β-oxido-17α,21-dihydroxy-4-pregnene - 3,20-dione 21-acetate in two milliliters of methylene chloride. The steroid solution is rinsed in with an additional one milliliter of methylene chloride. The solution is then kept at approximately minus thirty degrees centigrade for a period of about one hour and at minus ten degrees for a period of about two hours. At the end of this period it is mixed cautiously with an excess of cold sodium bicarbonate solution and the organic material is extracted with the aid of additional methylene chloride. The combined extracts are washed with water, dried over anhydrous sodium sulfate and concentrated to approximately 35 milliliters of volume. This solution is chromatographed over forty milliliters of Florisil anhydrous magnesium silicate, which on elution and crystallization gives 4-methyl-9α-fluorohydrocortisone 21-acetate.

A solution is prepared containing in one milliliter of acetic acid fifty milligrams of 4-methyl-9α-fluorohydrocortisone 21-acetate, twenty milligrams of chromic anhydride and one drop (approximately fifty milligrams) of water. This mixture is shaken several times at room temperature and allowed to stand for a period of about four hours. Thereafter it is poured into ten milliliters of water and refrigerated for approximately twenty hours at about five degrees centigrade. The steroid which separates from the aqueous mixture is collected on filter paper and recrystallized three times from acetone to give 4-methyl-9α-fluorocortisone 21-acetate.

The 4-methyl-9α-fluorohydrocortisone 21-acetate and 4-methyl-9α-fluorocortisone 21-acetate thus produced, can be hydrolyzed according to the procedure disclosed in Example 1A, above, for hydrolyzing 21-esters to the free 21-alcohols, to give 4-methyl-9α-fluorohydrocortisone and 4-methyl-9α-fluorocortisone, respectively.

In like manner, substitution of other 4-alkylhydrocortisone-21-acylates for 4-methylhydrocortisone 21-acetate in Example 1B, is productive of the corresponding 4-alkyl-9α-fluorohydrocortisone 21-acylate and 4-alkyl-9α-fluorocortisone 21-acylate, which can likewise be hydrolyzed to the corresponding 4-alkyl-9α-fluorohydrocortisone and 4-alkyl-9α-fluorocortisone.

The 4-alkyl-9α-fluorohydrocortisone, the 21-acylates thereof, 4-alkyl-9α-fluorocortisone, and the 21-acylates thereof possess central nervous-system-regulating, antirheumatoid arthritic, anti-inflammatory and glucocorticoid activities of improved therapeutic ratio, and in addition have a favorable effect on salt and water balance.

These compounds are useful in the treatment of inflammatory conditions of the skin, eyes and ears of humans and of valuable domestic animals, as well as contact dermatitis and other allergic reactions. Administration of the novel steroids can be in conventional dosage forms, such as pills, tablets, capsules, syrups or elixirs for oral use, or in liquid forms which are adaptable to the natural and synthetic cortical steroid hormones for injectable products. The novel compounds can also be administered topically in the form of ointments, creams, lotions and the like, with or without coacting antibiotics, germicides or other materials forming advantageous combinations therewith.

EXAMPLE 1C

*1-dehydro-4-methyl-9α-fluorohydrocortisone (4 - methyl-9α-fluoro-11β,17α,21-trihydroxy-1,4-pregnadiene - 3,20-dione)*

Five 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of *Septomyxa affinis* A.T.C.C. 6737. The Erlenmeyer flasks are shaken at room temperature (about 26 to 28 degrees centigrade) for a period of about three days. At the end of this period this 500-milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred thoroughly (300 r.p.m.) and aerated (0.1 liter of air per minute to ten liters of beer). After twenty hours of incubation, when a good growth has been developed, one gram of 4-methyl-9α-fluorohydrocortisone plus one half gram of 3-ketobisnor-4-cholen-22-al, dissolved in sixteen milliliters of dimethylformamide is added and the incubation carried out at the same temperature (28 degrees centigrade) and aeration for a period of 72 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated and the resulting residue is chromatographed over a Florisil anhydrous magnesium silicate column, which on elution and crystallization gives 1-dehydro-4-methyl-9α-fluorohydrocortisone.

Instead of a species of the genus Septomyxa, species of other genera such as Corynebacterium, Didymella, Calonectria, Alternaria, Colletotrichum, Cylindrocarpon, Ophiobolus, Fusarium, Listeria, Erysipelothrix, Mycobacterium, Tricothecium, Leptosphaeria, Cucurbitaria, Nocardia, and enzymes of fungi of the family Tuberculariaceae can be used to introduce a $\Delta^1$-bond into 4-methyl-9α-fluorohydrocortisone.

Instead of 4-methyl-9α-fluorohydrocortisone, 21-esters thereof can be used such as the 21-acetate, propionate, butyrate, isobutyrate, benzoate, acrylate and the like. However, in these cases the ester group is generally saponified during the fermentation process.

In like manner, substitution of 4-methyl-9α-fluorocortisone for 4-methyl-9α-fluorohydrocortisone is productive of 1-dehydro-4-methyl-9α-fluorocortisone.

Similarly, substitution of other 4-alkyl-9α-fluorohydrocortisones or 4-alkyl-9α-fluorocortisones for 4-methyl-9α-fluorohydrocortisone is productive of the corresponding 1-dehydro compound.

The selected 1-dehydro-4-alkyl-9α-fluorohydrocortisone or 1-dehydro-4-alkyl-9α-fluorocortisone thus obtained, can be esterified by known acylating methods, for example, as disclosed in Example 1A, above to produce the desired 1-dehydro-4-alkyl-9α-fluorohydrocortisone 21-acylate or 1 - dehydro - 4 - alkyl - 9α - fluorohydrocortisone 21-acylate, such as for example, the 21-acetate, 21-propionate, 21-benzoate, 21-hemisuccinate, 21-acrylate, and the like.

Alternatively the 4-alkyl-9α-fluorohydrocortisone, 4-alkyl-9α-fluorocortisone or the 21-acylates thereof can be 1-dehydrogenated by chemical dehydrogenation with selenium dioxide according to known procedures [e.g., Meystre et al., Helv. Chim. Acta, 39, 734 (1956)] to produce the corresponding 1-dehydro compounds.

The 1-dehydro-4-alkyl-9α-fluorohydrocortisone, 1-dehydro-4-alkyl-9α-fluorocortisone and their 21-acylates possess central nervous-system-regulating, anti-rheumatoid arthiritic, anti-inflammatory and glucocorticoid activities of improved therapeutic ratio and in addition have a favorable effect on salt and water balance. These compounds are useful in the treatment of inflammatory conditions of the skin, eyes and ears of humans and of valuable domestic animals, as well as contact dematitis and other allergic reactions. Administration of the novel steroids can be in conventional dosage forms, such as pills, tablets, capsules, syrups or elizirs for oral use, or in liquid forms which are adaptable to the natural and synthetic cortical steroid hormones for injectable products. The novel compounds can also be administered topically in the form of ointments, creams, lotions and the like, with or without coacting antibiotics, germicides or other materials forming advantageous combinations therewith.

EXAMPLE 2

*4-methyl-11-ketoprogesterone*

A. 5,11,20-TRIKETO-3,5-SECO-A-NORPREGNAN-3-OIC ACID

A solution containing 9.84 grams (thirty millimoles) of 4-pregnene-3,11,20-trione in 500 milliliters of 5:4 ethyl acetate glacial acetic acid was ozonized using an ozone-oxygen stream containing 0.48 millimole of ozone per minute per 430 milliliters. After 187 minutes the ozonization was stopped and there was added fifteen milliliters of a thirty percent aqueous hydrogen peroxide solution, and the solution was cooled overnight at plus five degrees centigrade. Skellysolve B hexanes (250 milliliters) was then added and the solution was washed twice with 250 milliliters of water. The water layers were extracted with 75 milliliters of ethyl acetate and the extracts were combined. The combined extracts were treated with two 75-milliliter portions of five percent aqueous sodium carbonate solution. The sodium carbonate layers were combined, acidified and extracted with methylene chloride. Evaporation of the methylene chloride gave 1.3 grams of crude 5,11,20-triketo-3,5-seco-A-norpregnan-3-oic acid. The infrared absorption spectrum showed —COOH bands at 2600 to 3400 cm.$^{-1}$ and C=O bands at 1698 cm.$^{-1}$ Extraction of the water washes with methylene chloride gave an additional 5.1 grams of crude 5,11,20-triketo-3,5-seco-A-norpregnan-3-oic acid.

B. 5-HYDROXY-11-KETO-20-ACETOXY-3,5-SECO-A-NOR-5,17-PREGNADIEN-3-OIC 3,5-LACTONE

A solution containing 2.5 grams of 5,11,20-triketo-3,5-seco-A-norpregnan-3-oic acid in fifteen milliliters of acetic anhydride and fifteen milliliters of acetyl chloride was warmed under reflux for a period of 48 hours. The solution was concentrated in vacuo to an oil, solution in acetone and concentration again yielded an oil. A portion of the oil containing 300 milligrams of the steroid was dissolved in five milliliters of methylene chloride and five milliliters of Skellysolve B hexanes were added; this solution was then chromatographed over eight grams of Florisil synthetic magnesium silicate. Elution with fifty percent methylene chloride-Skellysolve B hexanes gave 274 milligrams of a colorless viscous oil. The infrared absorption spectrum gave the following maxima, 1700, 1750, 1212, 1157, and 1125 reciprocal centimeters. The structure of the oil thus obtained is therefore 5-hydroxy-11 - keto - 20 - acetoxy - 3,5 - seco - A - nor - 5,17 - pregnadien-3-oic 3,5-lactone.

C. 4-METHYL-4-PREGNENE-3,11,20-TRIONE

Two grams of 5-hydroxy-11-keto-20-acetoxy-3,5-seco-nor-5,17-pregnadien-3-oic 3,5-lactone was digested with fifty milliliters of ether and filtered. A Grignard reagent was prepared from 0.26 gram of magnesium, twenty milliliters of ether, and 0.78 milliliter of ethyl iodide. (The ethyl iodide was added dropwise as a solution in five milliliters of ether). The Grignard reagent was added to the ether solution containing the enol lactone; after stirring thirty minutes the mixture was allowed to stand overnight. The mixture was then poured into fifty milliliters of iced aqueous ammonium chloride solution with stirring. After twenty minutes of stirring the reaction mixture was extracted with methylene chloride. The extract was washed with water and then concentrated to an oil. The oil was dissolved in 2.5 milliliters of acetic acid and 0.25 milliliter of concentrated hydrochloric acid was added. The atmosphere in the reaction flask was replaced with nitrogen and the mixture allowed to stand at room temperature (25 degrees centigrade) for 36 hours. The reaction mixture was then diluted with water, extracted with ether and the ether extract washed with aqueous alkali and water. The ether was then evaporated giving 0.40 gram of a neutral material. Chromatography over Florisil synthetic magnesium silicate and elution with five percent acetone is Skellysolve B hexanes gave an unknown oily material, subsequent elution with eight percent acetone in Skellysolve B hexanes gave 0.10 gram of crystalline 4-methyl - 4 - pregnene - 3,11,20 - trione. Recrystallization from acetone-Skellysolve B hexanes gave an analytical sample melting at 184–185 degrees centigrade; having an ultraviolet absorption $$\lambda_{max}^{alc.}$$

250 m$\mu$, $a_M$ 15,700, and a rotation of $[\alpha]_D$ plus 290 degrees in chloroform.

*Anal.*—Calculated for $C_{22}H_{30}O_3$: C, 77.15; H, 8.83. Found: C, 76.92; H, 8.68.

Similarly, substituting other alkyl magnesium halides, such as for example, propyl magnesium bromide, butyl magnesium iodide, isobutyl magnesium bromide, pentyl magnesium iodide and the like in place of ethyl magnesium iodide in part C of Example 2, above, is productive of other 4-alkyl-4-pregnene-3,11,20-triones, such as for example,
4-ethyl-4-pregnene-3,11,20-trione,
4-propyl-4-pregnene-3,11,20-trione,
4-isopropyl-4-pregnene-3,11,20-trione,
4-butyl-4-pregnene-3,11,20-trione and the like.

EXAMPLE 3

*4-methyl-21-acetoxy-4-pregnene-3,11,20-trione*

To a solution of 6.84 grams (0.02 mole) of 4-methyl-4-pregnene-3,11,20-trione in 100 milliliters of tertiary butyl alcohol was added at seventy degrees centigrade in an atmosphere of nitrogen and with stirring, 11.7 grams (0.08 mole) of ethyl oxalate. The temperature was permitted to drop to 55 degrees and 2.70 grams (0.05 mole) of sodium methoxide in twelve milliliters of dry methanol was added. The resulting pasty yellow suspension was stirred for fifteen minutes in an atmosphere of nitrogen.

A cooled solution of three grams (0.05 mole) of acetic acid in 160 milliliters of methanol was added to the suspension of the thus-produced sodium dienolate of 2,21-diethoxyoxalyl-4-methyl-11-ketoprogesterone to produce a solution of the free enol in the presence of an excess of sodium acetate. A solution of 5.1 grams (0.02 mole) of iodine in 100 milliliters of methanol was added. The solution was maintained at room temperature for two and one-half hours while stirring was continued under nitrogen.

To the resulting solution of 2,21-diethoxyoxalyl-4-methyl-21-iodo-4-pregnene-3,11,20-trione was added 39 grams of anhydrous potassium acetate and the solution was kept at room temperature for 24 hours. There was thus produced a solution of 2-ethoxyoxalyl-4-methyl-21-acetoxy-4-pregnene-3,11,20-trione resulting from the acetylation of the intermediately produced 2-ethoxyoxalyl-4-methyl-21-iodo-4-pregnene-3,11,20-trione.

The solution of 2-ethoxyoxalyl-4-methyl-21-acetoxy-4-pregnene-3,11,20-trione was poured into 1,500 milliliters of ice water containing 4.5 grams of sodium thiosulfate and forty milliliters of 5 N sulfuric acid. The precipitated yellow crude 2-ethoxyoxalyl-4-methyl-21-acetoxy-4- pregnene-3,11,20-trione was filtered, washed with water and dried.

The thus-isolated 2-ethoxyoxalyl-4-methyl-21-acetoxy-4-pregnene-3,11,20-trione was dissolved in 120 milliliters of methanol containing five grams of anhydrous sodium acetate. To the resulting deep red-brown solution cooled to about zero degrees centigrade, there was then slowly added a solution of 2.5 grams (0.0156 mole) of bromine in 25 milliliters of methanol. This solution containing 2 - bromo - 2 - ethoxyoxalyl - 4- methyl - 21 - acetoxy-4-pregnene-3,11,20-trione was then mixed with a solution of 0.845 gram (0.155 mole) of sodium methoxide in 3.45 milliliters of methanol and was stirred for one hour as the temperature of the solution was permitted to rise to room temperature.

The thus-produced reaction mixture containing 2-bromo - 4 - methyl - 21 - acetoxy - 4 - pregnene - 3,11,20-trione was mixed with eight milliliters of glacial acetic acid and 3.5 grams of zinc dust for one hour with vigorous stirring to produce 4-methyl-11-keto-21-acetoxyprogesterone. The resulting solution was filtered and the steroid in the filtrate precipitated by pouring it into 800 milliliters of ice water. The white amorphous precipitate was filtered and dried to yield crude 4-methyl-11-keto-21-acetoxyprogesterone which was chromatographed over 270 grams of Florisil magnesium silicate. The column was developed with ten fractions of Skellysolve B hexane hydrocarbons containing ten percent acetone and ten fractions of Skellysolve B containing twenty percent acetone. The eluate fractions containing twenty percent acetone were combined and the solvent distilled giving 4-methyl-21-acetoxy-4-pregnene-3,11,20-trione.

In the same manner, 4-ethyl-4-pregnene-3,11,20-trione,
4-propyl-4-pregnene-3,11,20-trione,
4-isopropyl-4-pregnene-3,11,20-trione,
4-butyl-4-pregnene-3,11,20-trione,
4-methyl-11β-hydroxy-4-pregnene-3,20-dione,
4-ethyl-11β-hydroxy-4-pregnene-3,20-dione,
4-propyl-11β-hydroxy-4-pregnene-3,20-dione,
4-isopropyl-11β-hydroxy-4-pregnene-3,20-dione,
4-methyl-11α-hydroxy-4-pregnene-3,20-dione,
4-ethyl-11α-hydroxy-4-pregnene-3,20-dione, and the like are similarly converted, when carried through the reactions described above, to 4-ethyl-21-acetoxy-4-pregnene-3,11,20-trione,
4-propyl-21-acetoxy-4-pregnene-3,11,20-trione,
4-isopropyl-21-acetoxy-4-pregnene-3,11,20-trione,
4-butyl-21-acetoxy-4-pregnene-3,11,20-trione,
4-methyl-11β-hydroxy-21-acetoxy-4-pregnene-3,20-dione,
4-ethyl-11β-hydroxy-21-acetoxy-4-pregnene-3,20-dione,
4-propyl-11β-hydroxy-21-acetoxy-4-pregnene-3,20-dione,
4 - isopropyl - 11β - hydroxy - 21 - acetoxy - 4 - pregnene-3,20-dione,
4-butyl-11β-hydroxy-21-acetoxy-4-pregnene-3,20-dione,
4-methyl-11α-hydroxy-21-acetoxy-4-pregnene-3,20-dione, and
4-ethyl-11α-hydroxy-21-acetoxy-4-pregnene-3,20-dione, respectively, and the like.

Substituting other alkali-metal salts of hydrocarbon carboxylic acids containing from one to twelve carbon atoms inclusive, e.g., potassium formate, sodium propionate, sodium butyrate, sodium valerate, potassium hexanoate, sodium laurate, sodium trimethylacetate, potassium isobutyrate, sodium isovalerate, potassium β-cyclopentylpropionate, sodium cyclohexane-carboxylate, potassium benzoate, sodium β-phenylpropionate, sodium hemisuccinate, potassium hemiadipate, sodium acrylate, potassium crotonate, sodium undecylenate, potassium propiolate, sodium cinnamate, potassium maleate, sodium citraconate, etc., for the potassium acetate employed immediately after the iodination, is productive of other 4-alkyl-21-acyloxy-4-pregnene-3,11,20-triones and 4-alkyl-11β-hydroxy-21-acyloxy-4-pregnene-3,20-diones, e.g., 4-methyl-21-formyloxy-4-pregnene-3,11,20-trione,
4-methyl-21-propionyloxy-4-pregnene-3,11,20-trione,
4-methyl-21-butyryloxy-4-pregnene-3,11,20-trione,
4-methyl-21-valeryloxy-4-pregnene-3,11,20-trione,
4-methyl-21-hexanoyloxy-4-pregnene-3,11,20-trione,
4-methyl-21-trimethylacetoxy-4-pregnene-3,11,20-trione,
4-methyl-21-isobutyryloxy-4-pregnene-3,11,20-trione,
4 - methyl - 21 - β - cyclopentylpropionyloxy - 4 - pregnene-3,11,20-trione,
4-methyl-21-benzoyloxy-4-pregnene-3,11,20-trione,
4-methyl-21-hemisuccinoyloxy-4-pregnene-3,11,20-trione,
4-methyl-21,acryloxy-4-pregnene-3,11,20-trione,
4-methyl-21-undecylenyloxy-4-pregnene-3,11,20-trione,
4-methyl-21-maleyloxy-4-pregnene-3,11,20-trione,
4 - methyl - 11β - hydroxy - 21 - formyloxy - 4 - pregnene-3,20-dione,
4 - methyl - 11β - hydroxy - 21 - propionyloxy - 4 - pregnene-3,-20-dione,
4 - methyl - 11β - hydroxy - 21 - butyryloxy - 4 - pregnene-3,20-dione,
4 - methyl - 11β - hydroxy - 21 - valeryloxy - 4 - pregnene-3,20-dione,
4 - methyl - 11β - hydroxy - 21 - lauroyloxy - 4 - pregnene-3,20-dione,
4 - methyl - 11β - hydroxy - 21 - cyclohexane - carboxyloxy-4-pregnene-3,20-dione,
4 - methyl - 11β - hydroxy - 21 - β - phenyl - propionyloxy-4-pregnene-3,20-dione,
4 - methyl - 11β - hydroxy - 21 - hemiadipyloxy - 4 - pregnene-3,20-dione,
4 - methyl - 11β - hydroxy - 21 - crotonyloxy - 4 - pregnene-3,20-dione,
4 - methyl - 11β - hydroxy - 21 - propiolyloxy - 4 - pregnene-3,20-dione,
4 - methyl - 11β - hydroxy - 21 - citraconyloxy - 4 - pregnene-3,20-dione,
4 - methyl - 11α - hydroxy - 21 - propionyloxy - 4 -pregnene-3,20,dione,
4 - ethyl - 11α - hydroxy - 21 - propionyloxy - 4 -pregnene-3,20-dione the corresponding 4-ethyl, 4-propyl, 4-isopropyl, 4-butyl compounds, and the like.

EXAMPLE 4

*4-methyl-21-hydroxy-4-pregnene-3,11,20-trione*

One gram of 4-methyl-21-acetoxy-4-pregnene-3,11,20-trione is dissolved in 100 milliliters of methanol, previously purged of air-oxygen by passing nitrogen through it for ten minutes, and thereto is added 0.5 gram of potassium bicarbonate in ten milliliters of water similarly purged of oxygen. The mixture is allowed to stand at room temperature in a nitrogen atmosphere for five to eight hours, thereupon neutralized with 0.66 milliliter of acetic acid in fifteen milliliters of water, and concentrated at reduced pressure and below sixty degrees centigrade until precipitation begins. Thereupon 100 milliliters of water is added and the mixture is chilled. The precipitate of crude 4-methyl-21-hydroxy-4-pregnene-3,11,20-trione is separated by filtration, washed with water, and dried. It can be purified by conventional means such as crystallization from methanol, acetone, ethyl acetate and the like, or chromatography over synthetic magnesium silicate.

Similarly, substituting as starting material 4-methyl-11β-hydroxy-21-acetoxy-4-pregnene-3,20-dione in place of 4-methyl-21-acetoxy-4-pregnene-3,11,20-trione, Example 4, above, is productive of 4-methyl-11β,21-dihydroxy-4-pregnene-3,20-dione.

In the same manner, other 4-alkyl-21-acyloxy-4-pregnene - 3,11,20 - triones, 4-alkyl-11β-hydroxy-21-acyloxy-4-pregnene-3,20-diones, and 4-alkyl-11α-hydroxy-21-acyloxy-4-pregnene-3,20-diones, such as those prepared in Example 3 above, e.g., 4-ethyl-21-propionyloxy-4-pregnene-3,11,20-trione, 4 - propyl-21-butyryloxy-4-pregnene-3,11,20-trione, 4-isopropyl-21-trimethylacetoxy - 4 - pregnene-3,11,20-trione, 4-butyl-21-benzoyloxy-4-pregnene-3,11,20-trione, 4-ethyl-11-β-hydroxy-21-acetoxy-4-pregnene-3,20-dione, 4 - propyl - 11β - hydroxy-21-isobutyryloxy-4-pregnene-3,20-dione, 4-isopropyl-11β-hydroxy-21-β-cyclopentylpropionyloxy-4-pregnene - 3,20 - dione, 4-butyl-11β-hydroxy-21-acrylyloxy-4-pregnene-3,20-dione, 4-methyl-11α-hydroxy - 21 - acetoxy-4-pregnene-3,20-dione, 4-ethyl-11α-hydroxy-21-propionyloxy-4-pregnene-3,20-dione, etc., when substituted as starting material in place of 4-methyl-21-acetoxy-4-pregnene-3,11,20-trione, Example 4, above, is productive of the corresponding 4-alkyl-21-hydroxy-4-pregnene-3,11,20-trione, 4-alkyl-11β,21-dihydroxy-4-pregnene-3,20-dione, and 4-alkyl-11α,21-dihydroxy-4-pregneen-3,20-dione, e.g., 4-ethyl-21-hydroxy-4-pregnene-3,11,20-trione, 4-propyl-21-hydroxy-4-pregnene-3,11,20-trione, 4 - isopropyl - 21 - hydroxy-4-pregnene-3,11,20-trione, 4-butyl-21-hydroxy-4-pregnene-3,11,20-trione, 4-ethyl-11β,21-dihydroxy-4-pregnene-3,20-dione, 4-propyl-11β,21-dihydroxy-4-pregnene-3,20-dione, 4-isopropyl-11β,21-dihydroxy-4-pregnene-3,20-dione, 4-butyl-11β,21-dihydroxy-4-pregnene-3,20-dione, 4-methyl-11α,21-dihydroxy-4-pregnene-3,20-dione, 4 - ethyl-11α,21-dihydroxy-4-pregnene-3,20-dione, and the like.

It is to be understood that the invention is not to be limited to the exact details shown and described, as obvious modifications and equivalents will be apparent to one skilled in the art, and the invention is therefore to be limited only by the scope of the appended claims.

We claim:

1. The process which comprises reacting an 11-oxygenated-4-pregnene-3,20-dione selected from the group consisting of 4-pregnene-3,11,20-trione and 11β-hydroxy-4-pregnene-3,20-dione with (a) a secondary cyclic amine to produce the corresponding 3-enamine, (b) reacting the said 3-enamine with an alkyl halide to produce the 4-alkyl-3-enamine, (c) hydrolyzing the latter compound to produce 4-alkyl-11-oxygenated-4-pregnene-3,20-dione.

2. The process which comprises reacting 4-pregnene-3,11,20-trione with (a) pyrrolidine to produce the corresponding 3-pyrrolidyl enamine, (b) reacting the said 3-pyrrolidyl enamine with an alkyl halide to produce the corresponding 4-alkyl-3-pyrrolidyl enamine, (c) hydrolyzing the latter compound with a base in the presence of water to produce 4-alkyl-4-pregnene-3,11,20-trione.

3. The process which comprises reacting an 11β-hydroxy-4-pregnene-3,20-dione with (a) pyrrolidine to produce the corresponding 3-pyrrolidyl enamine, (b) reacting the said 3-pyrrolidyl enamine with an alkyl halide to product the corresponding 4-alkyl-3-pyrrolidyl enamine, (c) hydrolyzing the latter compound with a base in the presence of water to produce 4-alkyl-11β-hydroxy-4-pregnene-3,20-dione.

4. The process which comprises reacting 4-pregnene-3,11,20-trione with (a) pyrrolidine to produce the corresponding 3-pyrrolidyl enamine, (b) reacting the said 3-pyrrolidyl enamine with methyl iodide to produce the corresponding 4-methyl-3-pyrrolidyl enamine, (c) hydrolyzing the latter compound with aqueous sodium hydroxide solution to produce 4-methyl-4-pregnene-3,11,20-trione.

5. The process which comprises reacting 11β-hydroxy-4-pregnene-3,20-dione with (a) pyrrolidine to produce the corresponding 3-pyrrolidyl enamine, (b) reacting the said 3-pyrrolidyl enamine with methyl iodide to produce the corresponding 4-methyl-3-pyrrolidyl enamine, (c) hydrolyzing the latter compound with aqueous sodium hydroxide to produce 4-methyl-11β-hydroxy-4-pregnene-3,20-dione.

References Cited in the file of this patent

UNITED STATES PATENTS

| 2,602,769 | Murray et al. | July 8, 1952 |
| 2,836,616 | Farrar | May 27, 1958 |
| 2,842,542 | Beal | July 8, 1958 |
| 2,843,603 | Stork | July 15, 1958 |

OTHER REFERENCES

Hechter et al.: J.A.C.S., Vol. 71, pages 3261-2 (1949).
Bell et al.: J. Chem. Soc., Vol. 1950, pages 1963-6.
Ott et al.: ibid., Vol. 74, pages 1239-41 (1952).
Wendler et al.: ibid., Vol. 74, pages 3630-3.
Fried et al.: ibid., Vol. 74, pages 3962-3.
Rosenkranz et al.: J. Org. Chem., Vol. 17, pages 290-3 (1952).
Fried: J.A.C.S., March 5, 1954, 76, pages 1455-1456.
Herz: J.A.C.S., September 20, 1956, 78, pages 4812-4814.
Meakins et al.: ibid., 1956, pages 4679-81.
Ringold et al.: ibid., Vol. 22, pages 602-5 (1957).
Steinberg et al.: Chemistry and Industry, pages 975-6, August 2, 1958.

UNITED STATES PATENT OFFICE
CERTIFICATION OF CORRECTION

Patent No. 3,019,237                          January 30, 1962

Raymond L. Pederson et al.

It is hereby certified that error appears in the above numbered patent requiring correction and that the said Letters Patent should read as corrected below.

Columns 1 and 2, the bottom left-hand formula should appear as shown below instead of as in the patent:

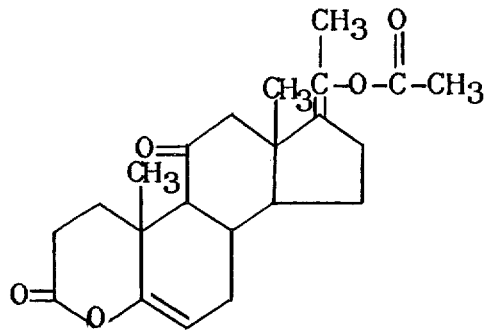

column 6, line 65, for "4-alkyl-2-" read -- 4-alkyl-21- --;
column 18, line 7, for "product" read -- produce --.

Signed and sealed this 19th day of June 1962.

(SEAL)
Attest:

ERNEST W. SWIDER                                        DAVID L. LADD
Attesting Officer                                          Commissioner of Patents